United States Patent [19]

Sircar

[11] E Re. 31,014

[45] Reissued Aug. 17, 1982

[54] SEPARATION OF MULTICOMPONENT GAS MIXTURES

[75] Inventor: Shivaji Sircar, Allentown, Pa.

[73] Assignee: Air Products and Chemicals, Inc., Allentown, Pa.

[21] Appl. No.: 248,774

[22] Filed: Mar. 30, 1981

Related U.S. Patent Documents

Reissue of:

[64] Patent No.: 4,171,206
Issued: Oct. 16, 1979
Appl. No.: 935,435
Filed: Aug. 21, 1978

[51] Int. Cl.[3] ..... B01D 53/04

[52] U.S. Cl. ..... 55/26; 55/58; 55/62; 55/75

[58] Field of Search ..... 55/20, 21, 25, 26, 33, 55/58, 62, 68, 74, 75, 179, 387, 389

[56] References Cited

U.S. PATENT DOCUMENTS

| | | | |
|---|---|---|---|
| 2,918,140 | 12/1959 | Brooks | 55/58 |
| 3,102,013 | 8/1963 | Skarstrom | 55/62 X |
| 3,150,942 | 9/1964 | Vasan | 55/33 X |
| 3,176,444 | 4/1965 | Kiyonaga | 55/26 |
| 3,221,476 | 12/1965 | Meyer | 55/179 X |
| 3,282,647 | 11/1966 | Skarstrom et al. | 55/33 X |
| 3,733,775 | 5/1973 | Barrere, Jr. | 55/62 X |
| 3,986,849 | 10/1976 | Fuderer et al. | 55/25 |
| 4,042,349 | 8/1977 | Baudouin et al. | 55/25 |
| 4,077,779 | 3/1978 | Sircar et al. | 55/25 |

*Primary Examiner*—Robert H. Spitzer
*Attorney, Agent, or Firm*—Thomas G. Ryder; E. Eugene Innis; James C. Simmons

[57] ABSTRACT

Multicomponent gas mixtures containing: (1) hydrogen as primary component, (2) a secondary key component that is more strongly sorbed by the adsorbent than hydrogen, and (3) a minor quantity of one or more dilute components less strongly sorbed than the secondary key component, are subject to selective adsorption in an adiabatic pressure swing cyclic system for the separate recovery of high purity hydrogen and of the secondary component. A given example is the treatment of a shift converter effluent gas from a hydrocarbon reformer plant, wherein hydrogen and carbon dioxide are separately recovered as key components substantially freed of minor dilute components such as methane, carbon monoxide and nitrogen.

27 Claims, 1 Drawing Figure

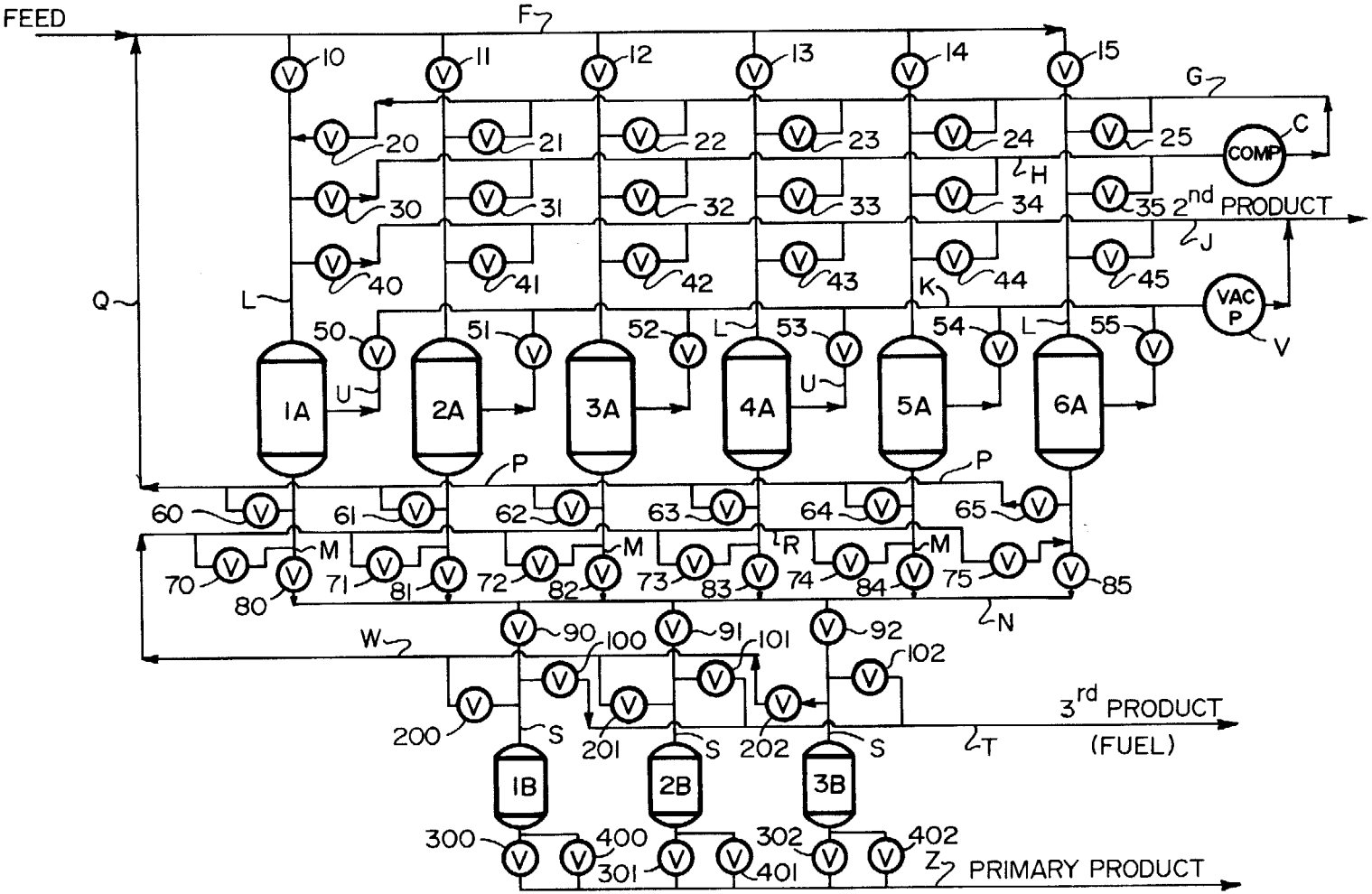
FEED
COMP
C
VAC P
V
2nd PRODUCT
3rd PRODUCT (FUEL)
PRIMARY PRODUCT
1A
2A
3A
4A
5A
6A
1B
2B
3B

SEPARATION OF MULTICOMPONENT GAS MIXTURES

Matter enclosed in heavy brackets [ ] appears in the original patent but forms no part of this reissue specification; matter printed in italics indicates the additions made by reissue.

RELATED APPLICATION

The present application is related to Applicants' companion application Ser. No. 935,424 filed of even date herewith entitled Separation of Multicomponent Gas Mixtures By Pressure Swing adsorption.

BACKGROUND OF THE INVENTION

1. Field of the Invention

This invention relates generally to separation of gaseous mixtures by selective adsorption and is more particularly concerned with an adiabatic pressure swing adsorption system designed and operated for separate recovery from a multicomponent gas mixture of a primary key component and a secondary key component, each substantially freed of the other key component and of the dilute components present in minor quantity in the original gas mixture subjected to treatment. To effect such separate recovery of desired components of the feed gas mixture the system of the invention uses separate beds of adsorbent in concurrent series gas flow therebetween during the adsorption stage, yet designed for independent operation during the regeneration or desorption stages.

2. Prior Art

Pressure swing cyclic adsorption systems designed for fractionation of gaseous mixtures by selective adsorption are well-known in the art. In these systems one or more desired components of the feed gas mixture are separately recovered at a yield and purity depending upon the modes of the designed operation and their efficiency.

Illustrative of typical systems indicated to be especially useful in the recovery of hydrogen from gaseous mixtures with $CH_4$ and/or $CO_2$ are those described in U.S. Pat. Nos. 3,138,439; 3,142,547; 3,788,037. Other patents describe in general systems for separation of essentially binary gas mixtures or of multicomponent gas mixtures. Illustrative of these are the systems for separation of essentially binary gas mixtures or of multicomponent gas mixtures, asserted to be applicable in recovery of hydrogen from such mixtures. Illustrative of these are the systems described, for example, in U.S. Pat. Nos. 3,221,476; 3,430,418; 3,720,042. Also among the systems described in the prior patent art are those employing separate adsorbent beds operated in series flow and designed for, or stated to be applicable in, separate recovery of hydrogen and one or more other components present in a multicomponent feed gas mixture. Typical among such systems are those described in U.S. Pat. Nos. 3,102,013; 3,149,934; 3,176,444; 3,237,379; 3,944,400; and 4,000,990.

According to the present invention, a primary key component and a secondary key component are recovered in separate streams at high purity and in good yield from a multicomponent feed gas mixture, each stream being substantially free of minor dilute contaminants originally present in the feed gas mixture. Such separation and recovery of the desired components are accomplished by the hereinafter described sequence and mode of operation in a system comprising a plurality of trains of adsorbent columns continuously operated in timed cyclic sequence.

In U.S. Pat. No. 4,077,779, there are described adsorption systems designed primarily for separation of binary gas mixtures which may contain trace amounts of other impurities. While the systems therein described can be successfully operated in the separation of such binary gas mixtures, these systems cannot be efficiently utilized in the individual recovery of two key components from a multicomponent gas mixture containing in addition to these major key components a minor quantity (more than trace amounts) of one or more contaminating dilute components. The presence of such dilute components may adversely affect the efficiency of gas separation of pressure swing adsorption techniques designed for handling essentially binary gas mixtures. However, the dilute components are often present in such a small quantity that there is little incentive for their separate recovery in highly enriched form. Thus for many multicomponent gas mixtures confronted in industry for separation therefrom of desired primary key and secondary key components at high purity and yield, an impure tertiary stream of the dilute components or their presence in the recovered secondary product is often acceptable.

Multicomponent gas mixtures containing a bulk primary component, a bulk secondary component and one or more dilute components, generally encountered in industrial separation can be classified into two different groups:

(1) Such mixtures in which the minor dilute components are less strongly adsorbed than the secondary key component.

(2) Such mixtures in which the minor dilute components are more strongly adsorbed than the secondary key component.

An example of a mixture of the first type is the gaseous effluent from a shift converter in a hydrocarbon reforming plant. A typical composition of such effluent may be 76% $H_2$, 20% $CO_2$, 3.5% $CH_4$, and 0.5% CO (each by volume). From such mixture $CO_2$ is to be removed as the secondary key component and hydrogen recovered as primary component in substantially pure state. The dilute impurities such as CO and $CH_4$, and $N_2$ if present, are less strongly adsorbed than $CO_2$ on most commercial sorbents such as activated carbons and certain molecular sieves. In separation of this kind of gas mixture, a preferred plan may be to obtain a stream of high purity $H_2$ as the primary product, a pure stream of $CO_2$ as the secondary product, and a tertiary stream containing the CO, $N_2$ and $CH_4$ impurities along with some $H_2$ which can be burnt as fuel.

An example of a mixture of the second type is the effluent gas from a hydrodesulfurization plant after the removal of the sulfur compounds, wherein it is desired to remove $CH_4$ to recover high purity recycle hydrogen. A typical desulfurized gas may contain for example: 65% $H_2$, 20% $CH_4$, and 5% each of $C_2$, $C_3$ and $C_4$–$C_6$ hydrocarbon components (each by volume). In this instance also hydrogen constitutes the primary component. The $C_2+$ hydrocarbons are more strongly sorbed than the secondary component ($CH_4$). The dilute impurities containing $C_2$–$C_6$ compounds in this case, may be tolerated in the secondary product stream.

The present invention is particularly concerned with multicomponent gas mixtures of the first kind hereinabove described. In such gas mixtures high recovery of the primary key component (hydrogen) is critical because any unrecovered hydrogen lost with the secondary key component product, mainly $CO_2$, cannot be efficiently burnt.

Systems for handling gas mixtures of the second type above-described is the subject of the aforesaid companion application Ser. No. 935,424. In treating gas mixtures of the second type, high recovery of the primary component is not as critical economically since the hydrogen, which is not recovered in the primary product, becomes a part of the secondary product mainly containing $CH_4$ and $C_2+$ components which can be used as fuel gas of high value.

Among the objectives obtained by practice of the present invention is the economical individual recovery of both the primary and secondary key components at high purity and improved product yields as compared to the identified prior art systems.

SUMMARY OF THE INVENTION

In practice of the pressure swing adsorption method according to the invention, a plurality of trains of adsorbent beds are operated in parallel and in timed sequence, each such train comprising a first bed containing an adsorbent selective for the retention of the secondary key component of the feed gas mixture and a second separate bed in series with said first bed, containing adsorbent selective for retention of other dilute components of the feed gas in preference over the primary key component. The adsorbent beds and the time sequence are so arranged that only one second bed is employed to serve two first beds. Thus a second bed and a first bed form a train of two beds in series during the adsorption step of a first bed at one part of the cycle, the same second bed provides another train of two beds in series during the adsorption step of another first bed at another part of the cycle. Consequently, the total number of second beds used in the system is half the number of first beds. Each train of adsorbent beds undergoes in its turn during a cycle the following sequence of steps:

1. Adsorption. The feed gas mixture at superatmospheric pressure is passed through a train of two adsorbent beds in series which have been previously pressurized to the feed gas pressure, with the withdrawal of an unadsorbed effluent comprising high purity hydrogen from the exit end of the second bed, as primary purified product. During this step the entire amount of the secondary key component ($CO_2$) from the feed mixture is retained in the first bed and the entire amounts of the dilute components (CO and $CH_4$) are retained in the second bed.

2. High pressure rinse. At the end of step 1 the flow of feed gas is switched to another train of adsorbent beds in the system which has been brought to the desired adsorption pressure. The first bed of the train that has undergone step 1, while substantially at its initial high pressure, is now rinsed with pure secondary component ($CO_2$) by admitting the rinse gas at the initial inlet end of that bed. During this step flow communication between the first and second beds of the initial adsorption train is discontinued.

2a. Pressure equalization I. While the rinsing of step 2 is taking place, the second bed of the train that has undergone step 1, is connected to another first bed which has previously been evacuated to lowest pressure level in the cycle. In this operation some of the gas (void gas plus desorbed gas, if any) is being transferred, thus lowering the pressure in the bed from which the gas flows.

2b. Pressure equalization II (optional). According to this mode of operation, the pressure in the second bed that has been partially reduced in step 2a is further lowered by gas transfer to another selected second bed.

2c. Desorption. The bed that has undergone step 2a (or also 2b) is further depressurized to or near ambient pressure.

3. Desorption I. The first bed that has undergone step 2 is now brought to a first intermediate pressure level by withdrawal of gas therefrom in a direction counter to that of step 1.

3a. Low pressure rinse. During step 3, the second bed that has been brought to ambient pressure (step 2C) is rinsed with a part of the high purity primary product (hydrogen).

3b. Pressurization. Flow of primary product gas into the second bed that has been rinsed in step 3a is continued to bring that bed to an intermediate pressure level and then to feed pressure level.

4. Desorption II. The first bed that has undergone step 3 is further depressurized to about ambient pressure level, by withdrawal of gas therefrom comprising chiefly the secondary key component.

5. Evacuation. Following step 4, the first bed that has undergone that step is now evacuated, withdrawing further quantities of the secondary component ($CO_2$).

6. Pressure equalization. Following evacuation in step 5 the first bed is brought to an intermediate pressure level by the admission thereto of the gas then being discharged (step 2a) from another second bed of the series.

7. Pressurization. Primary product gas ($H_2$) is then admitted into the first bed following step 6 to bring that bed to adsorption pressure level for start of a new cycle.

The operation of the invention will be fully understood and certain of its advantages more fully appreciated from the detailed description which follows read in connection with the accompanying drawing illustrating a practical embodiment of a preferred system in which the invention may be practiced.

The single FIGURE of the drawing is a flow diagram of a preferred embodiment employing a group of six adsorbent vessels with connecting conduits designed for operation in parallel in timed sequence, each of these vessels being connected to a second group of three adsorbent vessels through valved conduits designed to enable vessels of said first group to be placed in series flow communication with selected vessels of said second group.

DETAILED DESCRIPTION

Referring now to the drawing, the first group of vessels or adsorption columns are labeled respectively 1A, 2A, 3A, 4A, 5A and 6A. The second group of vessels or adsorption columns are labeled respectively 1B, 2B, 3B. The feed gas mixture to be separated may be delivered to a selected initial column of the A group from a feed gas manifold F, by opening the appropriate control valve 10, 11, 12, 13, 14, 15 in the branch line connecting manifold F to that column.

At the inlet end (being the top in the illustrated embodiment as an example) of each of the six vessels of the A group there is a gas connecting line L through which under appropriate valve openings gas can be selectively introduced and withdrawn from each of these A vessels. A gas manifold G is connected to the outlet of compressor C, whereby compressed gas can be introduced at the inlet of the desired vessel of the A group through its line L, through a valved connection between manifold G and that line by opening the desired valve shown respectively at 20, 21, 22, 23, 24, 25.

The inlet of compressor C is connected to gas manifold H, which in turn is connected to line L of each of the vessels of the A group by a valved connection under control of valves 30, 31, 32, 33, 34, 35 respectively, by means of which gas can be selectively withdrawn from the desired vessel into manifold H, compressed at C and transferred into any one of the other vessels of the A group as desired through manifold G on opening the appropriate valve in the group numbered 20 to 25.

Each of the vessels of the A group is also connected to a gas withdrawal manifold J through its line L under control of valves 40, 41, 42, 43, 44, 45 respectively. On opening the appropriate valve in the 40–45 numbered group, gas will flow from its associated vessel through its line L and into manifold J for discharge therefrom or other desired disposition.

Each of the vessels 1A through 6A also is in flow communication with a vacuum pump V through a manifold K, the manifold K being connected to each of these A group vessels through line U and through control valves 50, 51, 52, 53, 54, 55 respectively. Line U may be connected to the A vessel at an intermediate level (as shown) or at the feed inlet end of the vessel. Thus, by opening the appropriate valve of the group numbered 50–55, the associated vessel can be evacuated by operation of pump V and the gaseous product withdrawn from that vessel discharged into manifold K. As shown, the outlet of pump V is connected to discharge manifold J; however, the evacuated gases may be separately disposed of, if desired.

At the bottom of each of the columns 1A through 6A (hereinafter sometimes referred to as the outlet end) is a connecting line M in flow communication with a common gas receiving conduit N. Each of the A group vessels can thus discharge gas into conduit N through its associated line M by opening of the respective control valve 80, 81, 82, 83, 84, 85. Each of the vessels of the A group through its associated line M, is also connected to a common gas withdrawal conduit P under control of the respective valves 60, 61, 62, 63, 64, 65. Conduit P is in direct flow communication with manifold F through a connecting conduit Q.

Each of lines M is also connected through a branch to a common gas distributing conduit R under control of a valve 70, 71, 72, 73, 74, 75 respectively. By opening the appropriate valve of the 70–75 series, the associated A group vessel is brought into flow communication with conduit R.

Each of the vessels 1B, 2B, 3B is provided at its upper end (sometimes hereinafter called inlet end) with a gas line S connected to common gas receiving conduit N under control of valves 90, 91, 92 respectively. By opening a selected one of these valves 90–92 gas will flow from line N into the associated vessel 1B, 2B, or 3B through its line S.

Lines S also connect with a common tertiary gas product discharge conduit T under control of valves 100, 101, 102 respectively. The upper ends of vessels 1B, 2B, 3B are also in gas flow communication with gas distributing conduit R. As shown, each of the lines S of the group B vessels has a valve-controlled branch 200, 201, 202, respectively, discharging into a common gas collecting conduit W in direct flow communication with conduit R. By opening the selected valve 200, 201 or 202, gas will be caused to flow from the B vessel associated therewith into connecting conduit W and thence into distributing conduit R. By opening a selected valve in the 70–75 group gas can be caused to flow upwardly from conduit R into the associated vessel of the A group.

Each of the B vessels at its bottom end (sometimes hereinafter referred to as outlet end) is in flow communication with a primary product discharge manifold Z under control of a valved connection 300, 301, 302 respectively. By opening of any one of these valves gas will be caused to flow from the associated B vessel into manifold Z and thereby discharge unadsorbed primary products from that vessel. A portion of the primary products in manifold Z can be passed upwardly into any of the B vessels which is then at lower pressure than that of the gas in manifold Z. This is accomplished through valved connections 400, 401, 402 respectively. By opening any one of these valves 400–402 associated with a vessel then at lower pressure, primary gas product from manifold Z will be caused to flow into the vessel associated with the thus opened valve.

As hereinafter more fully explained, the timed sequence of valve openings and closings is so arranged that during an initial period that the feed gas mixture to be separated is being introduced into column 1A through open valve 10, valves 80, 90 and 300 are also open, so that the portion of the gas that is not adsorbed by the bed in Column 1A passes in series through Column 1B and the effluent gas from Column 1B discharges through open valves 300 into primary product discharge manifold Z. Thus, vessels 1A and 1B constitute companion columns operating in series during this part of the cycle and provide a train effective in selective adsorption of components of the initial gas mixture charged. In the same way columns 2A and 2B connected in series and 3A and 3B in series respectively constitute similarly operating trains when these are on the adsorption stage of their operating cycle.

The operating sequence is so arranged that each of the vessels 1B, 2B, 3B does double duty with respect to the A group of vessels. During the time that vessel 4A is placed on adsorption by opening valve 13, it is coupled in series with Column 1B through opened valves 83, 90 and 300. Thus vessels 4A and 1B coupled in series, constitute an adsorption train. In like manner vessels 5A and 2B, 6A and 3B respectively, operate as adsorption trains.

The sequence of process steps carried out in the illustrated system of six beds (A group) for initial preferential adsorption of the secondary key component ($CO_2$), selectively coupled to one or another of the three (B) beds of adsorbent for removal of the tertiary minor components, is as follows:

1. Adsorption—Flow the feed mixture through a pair of sorption vessels (say 1A and 1B in FIG. 1), connected in series through a communicating valve 80 between them, both of which are previously pressurized to the feed pressure level. Continue this step until the secondary key component breaks through the exit end of vessel 1A or somewhat short of it. Withdraw the effluent gas during this step from the exit end of vessel 1B as the purified primary product at approximately the feed gas pressure (minus the losses in the vessels and connecting lines). Vessel 1B is designed in such a way that it retains all of the dilute impurities in the feed during this step.

2. High Pressure Rinse—At the end of Step 1, flow a stream of essentially pure secondary component of the feed mixture at the feed pressure through the inlet end of vessel 1A. The communicating valve between vessels A and B is closed during this step. Continue this step until all of the void gas and any adsorbed primary component from vessel A is purged out of the vessel. Recycle the exit gas as feed into another A vessel undergoing step 1 during this period.

2a. Pressure Equalization I—While rinsing vessel 1A in step 2, connect vessel 1B with another A vessel which has previously been evacuated to the lowest pressure level in the cycle. The purpose of this step is to equalize the pressure between the two vessels, thereby transferring some of the gas (void+desorbed if any) from B vessel into A vessel. Pressure in vessel 1B decreases, while that in 1A rises. The direction of gas flow in vessel 1B during this step is countercurrent to that of step 1. The gas can be introduced into A vessel either through the inlet or the exit end of that vessel (FIG. 1 shows entry through the exit end).

2b. Pressure Equalization II—At the end of step 2a, connect vessel 1B with another B vessel which has been rinsed at low pressure with primary effluent (step 3a) for a second pressure equalization, thereby transferring more gas from vessel 1B into another B vessel. The direction of gas flow in vessel 1B during this step is the same as that in 2a, while the gas removed from 1B is introduced into another B vessel in the same direction as that of feed (step 1).

It should be emphasized here that the extent of steps 2a and 2b will be determined by various factors such as (i) feed pressure, (ii) feed composition, (iii) desorption characteristics, (iv) product purity, and (v) product recovery. It is conceivable that step 2B is completely eliminated for a certain demand in operation. In other words, the terminating pressure for the pressure equalization steps will be governed by the above-mentioned factors.

2c. Desorption—Depressurize vessel 1B countercurrent to the direction of feed (step 1) further down to near ambient pressure after the pressure equalization steps. The effluent during this step consists of the dilute impurities of the feed mixture along with some of the primary components. The duration of steps 2a plus 2b plus 2c is equal to that of step 2.

3. Desorption—Depressurize vessel 1A countercurrent to the direction of feed (step 1) to an intermediate pressure level. Recompress the desorbed gas, which is essentially pure secondary key component of the feed mixture, to feed pressure level and recirculate the compressed gas as the high pressure rinse gas (step 2) into another A vessel under going step 2 during this period.

3a. Low Pressure Rinse—While column 1A is undergoing step 3, rinse column 1B countercurrent to the direction of feed (step 1) at near ambient pressure using a part of the high purity primary product gas. The effluent from this step may be mixed with the effluent from step 2c and the mixed gas would constitute the tertiary by-product stream from the process. The extent of this step will be determined by the recovery and purity of the desired product.

3b. Pressurization—Pressurize vessel 1B with primary product gas countercurrent to the direction of feed to the pressure level achieved after step 2a. At this point, connect this vessel with one of the A vessels which has undergone step 6 below and further pressurize both vessels to the feed pressure. The direction of gas flow through both vessels during this step is countercurrent to that of the feed. The duration of steps 3a plus 3b equals to that of step 3. Vessel 1B is now ready for a new adsorption step.

4. Desorption II—Further depressurize column 1A countercurrent to the direction of the feed to ambient pressure level. Withdraw the desorbed gas during this step as secondary by-product comprising the secondary key component.

5. Evacuation—Evacuate vessel 1A to the lowest pressure level in the cycle, by gas withdrawal from an intermediate level thereof or at the feed inlet end thereof, countercurrent to the direction of the feed. Withdraw the evacuated gas as additional secondary by-product.

6. Pressure Equalization—Connect vessel 1A with one of the B vessels which is undergoing step 2a for pressure equalization, thereby pressurizing vessel 1A to an intermediate pressure level.

7. Pressurization—Further repressurize vessel 1A to feed pressure level using primary product gas by connecting it with one of the B vessel undergoing later part of step 3b.

At this point, vessel 1A is at feed pressure and ready for a new cycle starting from step 1. One of the B vessels is also ready to undergo the adsorption step with the 1A vessel.

Operation of an embodiment of the invention according to one mode (I) will now be explained in connection with an arbitrarily chosen 24 minute cycle, as set out in Table 1A (step 2B omitted).

TABLE 1A

PERFORMANCE OF THE VESSELS ACCORDING TO I CONFIGURATION (Step 2b excluded)

| Time (minutes) | Vessels | | | | | | | | |
|---|---|---|---|---|---|---|---|---|---|
| | 1A | 2A | 3A | 4A | 5A | 6A | 1B | 2B | 3B |
| 0-1 | A | PE | E | $D_2$ | $D_1$ | R | A | P | PE |
| 1-2 | A | PE | E | $D_2$ | $D_1$ | R | A | P | PE |
| 2-3 | A | | E | $D_2$ | $D_1$ | R | A | PR | D |
| 3-4 | A | PR | E | $D_2$ | $D_1$ | R | A | PR | D |
| 4-5 | R | A | PE | E | $D_2$ | $D_1$ | PE | A | P |
| 5-6 | R | A | PE | E | $D_2$ | $D_1$ | PE | A | P |
| 6-7 | R | A | | E | $D_2$ | $D_1$ | D | A | PR |
| 7-8 | R | A | PR | E | $D_2$ | $D_1$ | D | A | PR |
| 8-9 | $D_1$ | R | A | PE | E | $D_2$ | P | PE | A |
| 9-10 | $D_1$ | R | A | PE | E | $D_2$ | P | PE | A |
| 10-11 | $D_1$ | R | A | | E | $D_2$ | PR | D | A |
| 11-12 | $D_1$ | R | A | PR | E | $D_2$ | PR | D | A |
| 12-13 | $D_2$ | $D_1$ | R | A | PE | E | A | P | PE |
| 13-14 | $D_2$ | $D_1$ | R | A | PE | E | A | P | PE |
| 14-15 | $D_2$ | $D_1$ | R | A | | E | A | PR | D |
| 15-16 | $D_2$ | $D_1$ | R | A | PR | E | A | PR | D |
| 16-17 | E | $D_2$ | $D_1$ | R | A | PE | PE | A | P |
| 17-18 | E | $D_2$ | $D_1$ | R | A | PE | PE | A | P |
| 18-19 | E | $D_2$ | $D_1$ | R | A | | D | A | PR |
| 19-20 | E | $D_2$ | $D_1$ | R | A | PR | D | A | PR |
| 20-21 | PE | E | $D_2$ | $D_1$ | R | A | P | PE | A |
| 21-22 | PE | E | $D_2$ | $D_1$ | R | A | P | PE | A |
| 22-23 | | E | $D_2$ | $D_1$ | R | A | PR | D | A |
| 23-24 | PR | E | $D_2$ | $D_1$ | R | A | PR | D | A |

A = Adsorption
R = High Pressure Rinse
D = Desorption
$D_1$ = Desorption
$D_2$ = Desorption
E = Evacuation
PE = Press. Equal.
P = Purging
PR = Pressurization It is assumed that the train comprising columns 1A and 1B is initially to be put on stream for removal of $CO_2$ and other contaminants from a hydrogen-containing gas mixture. The A columns contain appropriate adsorbent materials, as hereinafter described, for selective adsorption of $CO_2$ (secondary key component) from the feed gas mixture, while the B columns contain adsorbent selective for adsorption of the minor diluents (such as $CH_4$ and/or CO).

The feed gas mixture is introduced into adsorbers 1A and 1B (both of which have been prepressurized to feed pressure) through valve 10 and the purified primary product stream is withdrawn through valve 300. The interconnecting valves 80 and 90 between the two vessels are kept open during this period. Valves 10, 80, 90 and 300 are closed when the secondary key component ($CO_2$ in example) is about to breakthrough the exit end of column 1A and the feed is switched to vessel 2A by opening the appropriate valves. Valves 20, 60 and 200 are opened immediately thereafter. A stream of essentially pure secondary key component at feed pressure is passed through vessel 1A co-current to the direction of feed. The stream is introduced through valve 20 and the exit void and displaced gas from 1A is withdrawn through valve 60. The exit gas is mixed with fresh feed and introduced into vessel 2A which is undergoing the adsorption step. During the same period of time, the vessel 1B is connected with vessel 3A which has been previously evacuated to the lowest pressure level in the cycle. Gas from 1B flows out through valve 200 and enters vessel 3A through valve 72. Optionally, when the pressure levels between vessels 1B and 3A become equal, valve 72 is closed and valve 202 is opened for the second pressure equalization between vessels 1B and 3B. If the second pressure equalization step is not needed, the duration of first pressure equalization step may be extended (see Tables 1A and 1B). Valve 200 is closed after the pressure equalization steps and vessel 1B is depressurized to ambient pressure by opening valve 100. The effluent through valve 100 constitutes part of tertiary product. Valves 20 and 72 are closed when all of the void and displaced gas from vessel 1A is purged out. Valve 30 is then opened and vessel 1A is depressurized to an intermediate pressure level. The desorbed gas during this step is recompressed and used to purge vessel 2A undergoing the high pressure rinse step. Simultaneously, control valve 400 is opened and a stream of high purity primary product is introduced into vessel 1B at a controlled rate countercurrent to the direction of flow in the sorption step. The exit gas flows out of the vessel 1B through valve 100 and withdrawn as tertiary product. After the required low pressure purge, valves 100 and 400 are closed, valve 200 is opened and vessel 1B is pressure equalized with vessel 2B. Valve 400 is opened again while closing valve 200 and vessel 1B is further pressurized with the primary product gas to the intermediate pressure level of A vessels at the end of step 6. Valve 200 is opened again along with valve 73 and vessels 1B and 4A are pressurized to feed pressure using primary effluent. In absence of the second pressure equalization step, valve 400 remains open during the entire period of low pressure purge and pressurization. Valves 73, 200 and 400 are then closed. Vessel 1B is now ready to go through a fresh cycle and engages with vessel 4A. The first desorption step of vessel 1A is completed during this time and valve 30 closes. Valve 40 opens and vessel 1A is depressurized to ambient pressure. The desorbed gas is withdrawn as secondary product. Valve 40 is closed and valve 50 is opened for evacuation of column 1A after the second desorption step. Valve 50 is closed after the evacuation step and valve 70 is opened for pressure equalizing vessel 1A with vessel 2B. Valve 70 is then closed for a period of time and reopened again for pressurizing 1A to the feed pressure using primary effluent gas via vessel 1B and valves 400 and 200. Column A is now ready to undergo another cycle.

The position of the various valves during a single cycle in which each of the adsorbent beds undergoes in timed sequence the steps outlined in Table 1A is shown in Table 2A. The designation 0 indicates that the valve is open, while the blanks indicate closed valves.

TABLE 2A

| TIME | VALVES | | | | | | | | | | | | | | | | | | | | | | | |
|---|---|---|---|---|---|---|---|---|---|---|---|---|---|---|---|---|---|---|---|---|---|---|---|---|
| (MINUTES) | 10 | 11 | 12 | 13 | 14 | 15 | 20 | 21 | 22 | 23 | 24 | 25 | 30 | 31 | 32 | 33 | 34 | 35 | 40 | 41 | 42 | 43 | 44 | 45 |
| 0–1 | 0 | | | | | | | | | | | 0 | | | | | 0 | | | | | 0 | | |
| 1–2 | 0 | | | | | | | | | | | 0 | | | | | 0 | | | | | 0 | | |
| 2–3 | 0 | | | | | | | | | | | 0 | | | | | 0 | | | | | 0 | | |
| 3–4 | 0 | | | | | | | | | | | 0 | | | | | 0 | | | | | 0 | | |
| 4–5 | | 0 | | | | | 0 | | | | | | | | | | | 0 | | | | | 0 | |
| 5–6 | | 0 | | | | | 0 | | | | | | | | | | | 0 | | | | | 0 | |
| 6–7 | | 0 | | | | | 0 | | | | | | | | | | | 0 | | | | | 0 | |
| 7–8 | | 0 | | | | | 0 | | | | | | | | | | | 0 | | | | | 0 | |
| 8–9 | | | 0 | | | | | 0 | | | | | 0 | | | | | | | | | | | 0 |
| 9–10 | | | 0 | | | | | 0 | | | | | 0 | | | | | | | | | | | 0 |
| 10–11 | | | 0 | | | | | 0 | | | | | 0 | | | | | | | | | | | 0 |
| 11–12 | | | 0 | | | | | 0 | | | | | 0 | | | | | | | | | | | 0 |
| 12–13 | | | | 0 | | | | | 0 | | | | | 0 | | | | | 0 | | | | | |
| 13–14 | | | | 0 | | | | | 0 | | | | | 0 | | | | | 0 | | | | | |
| 14–15 | | | | 0 | | | | | 0 | | | | | 0 | | | | | 0 | | | | | |
| 15–16 | | | | 0 | | | | | 0 | | | | | 0 | | | | | 0 | | | | | |
| 16–17 | | | | | 0 | | | | | 0 | | | | | 0 | | | | | 0 | | | | |
| 17–18 | | | | | 0 | | | | | 0 | | | | | 0 | | | | | 0 | | | | |
| 18–19 | | | | | 0 | | | | | 0 | | | | | 0 | | | | | 0 | | | | |
| 19–20 | | | | | 0 | | | | | 0 | | | | | 0 | | | | | 0 | | | | |
| 20–21 | | | | | | 0 | | | | | 0 | | | | | 0 | | | | | 0 | | | |
| 21–22 | | | | | | 0 | | | | | 0 | | | | | 0 | | | | | 0 | | | |
| 22–23 | | | | | | 0 | | | | | 0 | | | | | 0 | | | | | 0 | | | |
| 23–24 | | | | | | 0 | | | | | 0 | | | | | 0 | | | | | 0 | | | |

| TIME | VALVES | | | | | | | | | | | | | | | | | | | | | | | |
|---|---|---|---|---|---|---|---|---|---|---|---|---|---|---|---|---|---|---|---|---|---|---|---|---|
| (MINUTES) | 50 | 51 | 52 | 53 | 54 | 55 | 60 | 61 | 62 | 63 | 64 | 65 | 70 | 71 | 72 | 73 | 74 | 75 | 80 | 81 | 82 | 83 | 84 | 85 |
| 0–1 | | | 0 | | | | | | | | | 0 | | 0 | | | | | 0 | | | | | |
| 1–2 | | | 0 | | | | | | | | | 0 | | 0 | | | | | 0 | | | | | |
| 2–3 | | | 0 | | | | | | | | | 0 | | | | | | | 0 | | | | | |
| 3–4 | | | 0 | | | | | | | | | 0 | | 0 | | | | | 0 | | | | | |
| 4–5 | | | | 0 | | | 0 | | | | | | | | 0 | | | | | 0 | | | | |
| 5–6 | | | | 0 | | | 0 | | | | | | | | 0 | | | | | 0 | | | | |
| 6–7 | | | | 0 | | | 0 | | | | | | | | | | | | | 0 | | | | |
| 7–8 | | | | 0 | | | 0 | | | | | | | | 0 | | | | | 0 | | | | |
| 8–9 | | | | | 0 | | | 0 | | | | | | | | 0 | | | | | 0 | | | |
| 9–10 | | | | | 0 | | | 0 | | | | | | | | 0 | | | | | 0 | | | |
| 10–11 | | | | | 0 | | | 0 | | | | | | | | | | | | | 0 | | | |
| 11–12 | | | | | 0 | | | 0 | | | | | | | | 0 | | | | | 0 | | | |
| 12–13 | | | | | | 0 | | | 0 | | | | | | | | 0 | | | | | 0 | | |
| 13–14 | | | | | | 0 | | | 0 | | | | | | | | 0 | | | | | 0 | | |
| 14–15 | | | | | | 0 | | | 0 | | | | | | | | | | | | | 0 | | |
| 15–16 | | | | | | 0 | | | 0 | | | | | | | | 0 | | | | | 0 | | |
| 16–17 | 0 | | | | | | | | | 0 | | | | | | | | 0 | | | | | 0 | |
| 17–18 | 0 | | | | | | | | | 0 | | | | | | | | 0 | | | | | 0 | |
| 18–19 | 0 | | | | | | | | | 0 | | | | | | | | | | | | | 0 | |
| 19–20 | 0 | | | | | | | | | 0 | | | | | | | | 0 | | | | | 0 | |
| 20–21 | | 0 | | | | | | | | | 0 | | 0 | | | | | | | | | | | 0 |
| 21–22 | | 0 | | | | | | | | | 0 | | 0 | | | | | | | | | | | 0 |
| 22–23 | | 0 | | | | | | | | | 0 | | | | | | | | | | | | | 0 |
| 23–24 | | 0 | | | | | | | | | 0 | | 0 | | | | | | | | | | | 0 |

| TIME | VALVES | | | | | | | | | | | | | | | |
|---|---|---|---|---|---|---|---|---|---|---|---|---|---|---|---|---|
| (MINUTES) | 90 | 91 | 92 | 100 | 101 | 102 | 200 | 201 | 202 | 300 | 301 | 302 | 400 | 401 | 402 |
| 0–1 | 0 | | | | 0 | | | | 0 | 0 | | | | 0 | |
| 1–2 | 0 | | | | 0 | | | | 0 | 0 | | | | 0 | |
| 2–3 | 0 | | | | | 0 | | | | 0 | | | | 0 | |
| 3–4 | 0 | | | | | 0 | | | | 0 | | | | 0 | |
| 4–5 | | 0 | | | | 0 | 0 | | | | 0 | | | | 0 |
| 5–6 | | 0 | | | | 0 | 0 | | | | 0 | | | | 0 |
| 6–7 | | 0 | | 0 | | | | | | | 0 | | | | 0 |
| 7–8 | | 0 | | 0 | | | | | | | 0 | | | | 0 |
| 8–9 | | | 0 | 0 | | | | 0 | | | | 0 | 0 | | |
| 9–10 | | | 0 | 0 | | | | 0 | | | | 0 | 0 | | |
| 10–11 | | | 0 | | 0 | | | | | | | 0 | 0 | | |
| 11–12 | | | 0 | | 0 | | | | | | | 0 | 0 | | |
| 12–13 | 0 | | | | 0 | | | | 0 | 0 | | | | 0 | |
| 13–14 | 0 | | | | 0 | | | | 0 | 0 | | | | 0 | |
| 14–15 | 0 | | | | | 0 | | | | 0 | | | | 0 | |
| 15–16 | 0 | | | | | 0 | | | | 0 | | | | 0 | |
| 16–17 | | 0 | | | | 0 | 0 | | | | 0 | | | | 0 |
| 17–18 | | 0 | | | | 0 | 0 | | | | 0 | | | | 0 |
| 18–19 | | 0 | | 0 | | | | | | | 0 | | | | 0 |
| 19–20 | | 0 | | 0 | | | | | | | 0 | | | | 0 |
| 20–21 | | | 0 | 0 | | | | 0 | | | | 0 | 0 | | |
| 21–22 | | | 0 | 0 | | | | 0 | | | | 0 | 0 | | |

TABLE 2A-continued

| | | | | |
|---|---|---|---|---|
| 22–23 | 0 | 0 | 0 | 0 |
| 23–24 | 0 | 0 | 0 | 0 |

0 = Open
Blank = Closed

In the alternative mode (II) of operation each of the B vessels undergoes the second pressure equalization step described under step 2b above, which is omitted in the sequence outlined in Table 1A. The process steps undergone in sequence in the alternative operational mode is outlined in Table 1B and the valve positions during such cycle as shown in Table 2B for an arbitrarily chosen 24 minute cycle.

TABLE 1B

PERFORMANCE OF THE VESSELS ACCORDING TO II CONFIGURATION (Step 2b Included)

| Time (Minutes) | Vessels 1A | 2A | 3A | 4A | 5A | 6A | 1B | 2B | 3B |
|---|---|---|---|---|---|---|---|---|---|
| 0–1 | A | PE | E | $D_2$ | $D_1$ | R | A | P | PE |
| 1–2 | A | | E | $D_2$ | $D_1$ | R | A | PE | PE |
| 2–3 | A | | E | $D_2$ | $D_1$ | R | A | PR | D |
| 3–4 | A | PR | E | $D_2$ | $D_1$ | R | A | PR | D |
| 4–5 | R | A | PE | E | $D_2$ | $D_1$ | PE | A | P |
| 5–6 | R | A | | E | $D_2$ | $D_1$ | PE | A | PE |
| 6–7 | R | A | | E | $D_2$ | $D_1$ | D | A | PR |
| 7–8 | R | A | PR | E | $D_2$ | $D_1$ | D | A | PR |
| 8–9 | $D_1$ | R | A | PE | E | $D_2$ | P | PE | A |
| 9–10 | $D_1$ | R | A | | E | $D_2$ | PE | PE | A |
| 10–11 | $D_1$ | R | A | | E | $D_2$ | PR | D | A |

TABLE 1B-continued

PERFORMANCE OF THE VESSELS ACCORDING TO II CONFIGURATION (Step 2b Included)

| Time (Minutes) | Vessels 1A | 2A | 3A | 4A | 5A | 6A | 1B | 2B | 3B |
|---|---|---|---|---|---|---|---|---|---|
| 11–12 | $D_1$ | R | A | PR | E | $D_2$ | PR | D | A |
| 12–13 | $D_2$ | $D_1$ | R | A | PE | E | A | P | PE |
| 13–14 | $D_2$ | $D_1$ | R | A | | E | A | PE | PE |
| 14–15 | $D_2$ | $D_1$ | R | A | | E | A | PR | D |
| 15–16 | $D_2$ | $D_1$ | R | A | PR | E | A | PR | D |
| 16–17 | E | $D_2$ | $D_1$ | R | A | PE | PE | A | P |
| 17–18 | E | $D_2$ | $D_1$ | R | A | | PE | A | PE |
| 18–19 | E | $D_2$ | $D_1$ | R | A | | D | A | PR |
| 19–20 | E | $D_2$ | $D_1$ | R | A | PR | D | A | PR |
| 20–21 | PE | E | $D_2$ | $D_1$ | R | A | P | PE | A |
| 21–22 | | E | $D_2$ | $D_1$ | R | A | PE | PE | A |
| 22–23 | | E | $D_2$ | $D_1$ | R | A | PR | D | A |
| 23–24 | PR | E | $D_2$ | $D_1$ | R | A | PR | D | A |

A = Adsorption
R = High Pressure Rinse
D = Desorption
$D_1$ = Desorption
$D_2$ = Desorption
E = Evacuation
PE = Press. Equal.
PR = Pressurization
P = Purging

TABLE 2B

| TIME (MINUTES) | VALVES 10 | 11 | 12 | 13 | 14 | 15 | 20 | 21 | 22 | 23 | 24 | 25 | 30 | 31 | 32 | 33 | 34 | 35 | 40 | 41 | 42 | 43 | 44 | 45 |
|---|---|---|---|---|---|---|---|---|---|---|---|---|---|---|---|---|---|---|---|---|---|---|---|---|
| 0–1 | 0 | | | | | | | | | | | 0 | | | | | 0 | | | | | 0 | | |
| 1–2 | 0 | | | | | | | | | | | 0 | | | | | 0 | | | | | 0 | | |
| 2–3 | 0 | | | | | | | | | | | 0 | | | | | 0 | | | | | 0 | | |
| 3–4 | 0 | | | | | | | | | | | 0 | | | | | 0 | | | | | 0 | | |
| 4–5 | | 0 | | | | | 0 | | | | | | | | | | | 0 | | | | | 0 | |
| 5–6 | | 0 | | | | | 0 | | | | | | | | | | | 0 | | | | | 0 | |
| 6–7 | | 0 | | | | | 0 | | | | | | | | | | | 0 | | | | | 0 | |
| 7–8 | | 0 | | | | | 0 | | | | | | | | | | | 0 | | | | | 0 | |
| 8–9 | | | 0 | | | | | 0 | | | | | 0 | | | | | | | | | | | 0 |
| 9–10 | | | 0 | | | | | 0 | | | | | 0 | | | | | | | | | | | 0 |
| 10–11 | | | 0 | | | | | 0 | | | | | 0 | | | | | | | | | | | 0 |
| 11–12 | | | 0 | | | | | 0 | | | | | 0 | | | | | | | | | | | 0 |
| 12–13 | | | | 0 | | | | | 0 | | | | | 0 | | | | | 0 | | | | | |
| 13–14 | | | | 0 | | | | | 0 | | | | | 0 | | | | | 0 | | | | | |
| 14–15 | | | | 0 | | | | | 0 | | | | | 0 | | | | | 0 | | | | | |
| 15–16 | | | | 0 | | | | | 0 | | | | | 0 | | | | | 0 | | | | | |
| 16–17 | | | | | 0 | | | | | 0 | | | | | 0 | | | | | 0 | | | | |
| 17–18 | | | | | 0 | | | | | 0 | | | | | 0 | | | | | 0 | | | | |
| 18–19 | | | | | 0 | | | | | 0 | | | | | 0 | | | | | 0 | | | | |
| 19–20 | | | | | 0 | | | | | 0 | | | | | 0 | | | | | 0 | | | | |
| 20–21 | | | | | | 0 | | | | | 0 | | | | | 0 | | | | | 0 | | | |
| 21–22 | | | | | | 0 | | | | | 0 | | | | | 0 | | | | | 0 | | | |
| 22–23 | | | | | | 0 | | | | | 0 | | | | | 0 | | | | | 0 | | | |
| 23–24 | | | | | | 0 | | | | | 0 | | | | | 0 | | | | | 0 | | | |

| TIME (MINUTES) | VALVES 50 | 51 | 52 | 53 | 54 | 55 | 60 | 61 | 62 | 63 | 64 | 65 | 70 | 71 | 72 | 73 | 74 | 75 | 80 | 81 | 82 | 83 | 84 | 85 |
|---|---|---|---|---|---|---|---|---|---|---|---|---|---|---|---|---|---|---|---|---|---|---|---|---|
| 0–1 | | | 0 | | | | | | | | | 0 | | 0 | | | | | 0 | | | | | |
| 1–2 | | | 0 | | | | | | | | | 0 | | | | | | | 0 | | | | | |
| 2–3 | | | 0 | | | | | | | | | 0 | | | | | | | 0 | | | | | |
| 3–4 | | | 0 | | | | | | | | | 0 | | 0 | | | | | 0 | | | | | |
| 4–5 | | | | 0 | | | 0 | | | | | | | | 0 | | | | | 0 | | | | |
| 5–6 | | | | 0 | | | 0 | | | | | | | | | | | | | 0 | | | | |
| 6–7 | | | | 0 | | | 0 | | | | | | | | | | | | | 0 | | | | |
| 7–8 | | | | 0 | | | 0 | | | | | | | | 0 | | | | | 0 | | | | |
| 8–9 | | | | | 0 | | | 0 | | | | | | | | 0 | | | | | 0 | | | |
| 9–10 | | | | | 0 | | | 0 | | | | | | | | | | | | | 0 | | | |
| 10–11 | | | | | 0 | | | 0 | | | | | | | | | | | | | 0 | | | |
| 11–12 | | | | | 0 | | | 0 | | | | | | | | 0 | | | | | 0 | | | |
| 12–13 | | | | | | 0 | | | 0 | | | | | | | | 0 | | | | | 0 | | |

TABLE 2B-continued

| | | | | | | | | | | | | | | | |
|---|---|---|---|---|---|---|---|---|---|---|---|---|---|---|---|
| 13-14 | | | | 0 | | 0 | | | | | | | | 0 | |
| 14-15 | | | | 0 | | 0 | | | | | | | | 0 | |
| 15-16 | | | | 0 | | 0 | | | | | 0 | | | 0 | |
| 16-17 | 0 | | | | | | 0 | | | | | 0 | | | 0 |
| 17-18 | 0 | | | | | | 0 | | | | | | | | 0 |
| 18-19 | 0 | | | | | | 0 | | | | | | | | 0 |
| 19-20 | 0 | | | | | | 0 | | | | | 0 | | | 0 |
| 20-21 | | 0 | | | | | | 0 | | 0 | | | | | | 0 |
| 21-22 | | 0 | | | | | | 0 | | | | | | | | 0 |
| 22-23 | | 0 | | | | | | 0 | | | | | | | | 0 |
| 23-24 | | 0 | | | | | | 0 | | 0 | | | | | | 0 |

| TIME | VALVES | | | | | | | | | | | | | | |
|---|---|---|---|---|---|---|---|---|---|---|---|---|---|---|---|
| (MINUTES) | 90 | 91 | 92 | 100 | 101 | 102 | 200 | 201 | 202 | 300 | 301 | 302 | 400 | 401 | 402 |
| 0-1 | 0 | | | | 0 | | | | 0 | 0 | | | | 0 | |
| 1-2 | 0 | | | | 0 | | | 0 | 0 | 0 | | | | 0 | |
| 2-3 | 0 | | | | | 0 | | | | 0 | | | | 0 | |
| 3-4 | 0 | | | | | 0 | | | | 0 | | | | 0 | |
| 4-5 | | 0 | | | | 0 | 0 | | | | 0 | | | | 0 |
| 5-6 | | 0 | | | | 0 | 0 | | 0 | | 0 | | | | 0 |
| 6-7 | | 0 | | 0 | | | | | | | 0 | | | | 0 |
| 7-8 | | 0 | | 0 | | | | | | | 0 | | | | 0 |
| 8-9 | | | 0 | 0 | | | | 0 | | | | 0 | 0 | | |
| 9-10 | | | 0 | 0 | | | 0 | 0 | | | | 0 | 0 | | |
| 10-11 | | | 0 | | 0 | | | | | | | 0 | 0 | | |
| 11-12 | | | 0 | | 0 | | | | | | | 0 | 0 | | |
| 12-13 | 0 | | | | 0 | | | | 0 | 0 | | | | 0 | |
| 13-14 | 0 | | | | 0 | | | 0 | 0 | 0 | | | | 0 | |
| 14-15 | 0 | | | | | 0 | | | | 0 | | | | 0 | |
| 15-16 | 0 | | | | | 0 | | | | 0 | | | | 0 | |
| 16-17 | | 0 | | | | 0 | 0 | | | | 0 | | | | 0 |
| 17-18 | | 0 | | | | 0 | 0 | | 0 | | 0 | | | | 0 |
| 18-19 | | 0 | | 0 | | | | | | | 0 | | | | 0 |
| 19-20 | | 0 | | 0 | | | | | | | 0 | | | | 0 |
| 20-21 | | | 0 | 0 | | | | 0 | | | | 0 | 0 | | |
| 21-22 | | | 0 | 0 | | | 0 | 0 | | | | 0 | 0 | | |
| 22-23 | | | 0 | | 0 | | | | | | | 0 | 0 | | |
| 23-24 | | | 0 | | 0 | | | | | | | 0 | 0 | | |

EXAMPLE

The nine bed embodiment of the invention as illustrated in FIG. 1 will be more fully understood by the following example:

The system consists of six A beds, each packed with 96.7 lbs (44.0 kg) of BPL activated carbon, and three B beds, each packed with a layer of 61.9 lbs (28.1 kg) of BPL carbon and a layer of 17.6 lbs (8.0 kg) of 5 A molecular sieve. A feed gas comprising of 76.73% $H_2$, 18.71% $CO_2$, 4.10% $CH_4$ and 0.46% CO (by volume) at 265 psia (18.0 bar) and a temperature of 100° F. (37.8° C.) is introduced into one of the A columns connected in series with one of the B columns, both of which are previously pressurized to the feed gas pressure level. The feed flow rate is 11.3 lb moles/hour (5.1 kg moles/-hour). A stream of essentially pure $H_2$ comprising of 99.99+% $H_2$ (by volume) is withdrawn through the exit end of the B column. A part of this stream is withdrawn as product $H_2$ at a rate of 7.90 lb moles/hour (3.6 kg moles/hour). The adsorption step is continued for four minutes when the feed is switched to another A column. Then the communicating valve between the A and the B columns is closed and the column A is rinsed with a stream of 99.99+% pure $CO_2$ at about 265 psia (18.0 bar). The rinse gas is introduced into the A column through the same inlet as that for the feed gas at a rate of 3.11 lb moles/hour (1.4 kg moles/hour). The effluent gas from the first column during this step is withdrawn from the outlet end of the A column at a rate of 1.18 lb moles/hour (0.54 kg moles/hour). The effluent gas has essentially the same composition as feed gas and it is recycled as feed to another column receiving fresh feed gas. This step is continued for four minutes. While column A is rinsed with $CO_2$, column B is desorbed by connecting it with another A vessel which is previously evacuated to the lowest pressure level in the process. The pressure equalization step is carried out for one minute and the pressure level in the two beds at the end of this step is about 116 psia (7.9 bar). The B bed is then further depressurized by connecting it with another B vessel which is previously purged with $H_2$ product gas. The second pressure equalization is also carried out for one minute and the pressure level in the two beds at the end of this step is about 58 psia (3.9 bar). The B bed is then further depressurized to near ambient pressure level while withdrawing the effluent gas as the tertiary product. This step is carried out for two minutes.

Column A is now depressurized for four minutes to a pressure level of about 51 psia (3.5 bar). The effluent gas comprising of essentially pure $CO_2$ is recompressed to about 265 psia (18.0 bar) and recycled into another A column as the high pressure rinse gas. While column A is desorbing, column B is first purged with a portion of the high purity $H_2$ effluent from the adsorption step for a period of one minute. The effluent gas from column B during the purge step is withdrawn as the tertiary product. The combined flow rate of the tertiary product is 1.29 lb moles/hr (0.59 kg moles/hour) and has a composition of about 59.0% $H_2$, 36.0% $CH_4$, 4.1% CO and a trace amount of $CO_2$. The B column is then connected with another B column, which other B column is undergoing the pressure reduction step, in order to pressure equalize both B columns to about 58 psia. This step is carried out for one minute. The B column is then pressurized in one minute to a pressure level of about 116 psia (7.9 bar) by flowing a portion of the high purity $H_2$ effluent from the adsorption step. Finally the B column is connected to an A column which is previously pressurized to about 116 psia (7.9 bar) and then both columns are pressurized to about 265 psia (18.0 bar) by flowing a portion of the high purity $H_2$ effluent from the adsorption step. The pressurization step is carried out in one minute. The B column is now ready to undergo another cycle of operation according to the scheme of the embodiment.

Column A is then further depressurized to near ambient pressure in four minutes. The desorbed gas comprising of essentially pure $CO_2$ is withdrawn as the secondary key component product.

Next, column A is evacuated to a pressure level of 2.4 psia (0.16 bar) in four minutes. The evacuated gas is also withdrawn as secondary product. The total flow rate of the secondary product is 2.11 lb moles/hr (0.96 kg moles/hour) and its composition is 99.99+% $CO_2$.

Column A is then pressurized to a level of about 116 psia (7.9 bar) by connecting it with a B column which is undergoing the first pressure equalization step.

Finally the A column is pressurized to a level of about 265 psia (18.0 bar) by connecting it with a B column which is already pressurized to a level of about 116 psia (7.9 bar) and flowing the high purity $H_2$ effluent from the adsorption step. The A column is now ready to undergo another cycle of operation according to the scheme of the embodiment.

As a consequence of this operation, the feed gas is fractionated into a primary product comprising of 99.99+% $H_2$ by volume with a hydrogen recovery from the feed gas of about 91.1%; a secondary product comprised of 99.99+% $CO_2$ by volume with a carbon dioxide recovery from the feed gas of about 99.9+%; and a tertiary product comprising essentially 59.0% $H_2$, 36.0% $CH_4$, 4.1% CO by volume and a trace amount of $CO_2$ with a very good fuel value.

While the invention has been particularly described in connection with the separation and recovery of hydrogen as the primary key component and carbon dioxide as the secondary key component from a gas mixture containing these accompanied by minor (tertiary) components, it will be understood that the described system and operation can be advantageously employed in the separation of other multicomponent gas mixtures having present therein a major portion of (1) primary key component which is not substantially adsorbed in either of the adsorbent beds of a train, (2) a secondary key component desired to be recovered and which is preferentially adsorbed and (3) one or more dilute components which are less strongly adsorbed than the secondary key component. Any sorbent which is selective towards the secondary key component of the feed mixture can be used in the A vessels. The sorbent in the B vessels should be selective for the minor tertiary components of the feed mixture or there may be employed in the B vessels a combination of sorbents for that purpose. Thus, for the multicomponent gas mixture of the illustrative example, comprising hydrogen (primary), $CO_2$ (secondary) and dilute impurities (tertiary) such as $CH_4$ and CO, the A vessels may contain a carbonaceous sorbent such as BPL activated carbon or MSC-V carbon. In the B vessels a combination of sorbents may be employed such as BPL carbon and 5 A° molecular sieve zeolites. In general, the choice of the particular sorbent is governed by the operating conditions (such as temperature and pressure) employed in the separation process and the composition of the feed gas and the nature of the impurities sought to be removed and the nature of the product qualities and recoveries demanded by the application.

The key benefits that can be achieved by operation according to this invention are:

1. High purity of the primary product stream (e.g. hydrogen).
2. High recovery of the primary key component at such high purity.
3. Recovery at high purity of an economically valuable secondary product stream (e.g. $CO_2$).
4. Very high yield of the secondary product at high purity.
5. Absence of significant amounts of the secondary key component in the tertiary product stream. This may allow useful utilization of that stream which may not be possible if the secondary key component is present in that stream in substantial quantity. For instance, the example given in the text will produce a tertiary stream containing CO, $CH_4$ and $H_2$, substantialy free from $CO_2$, thus enabling the use of such stream as good quality fuel gas.
6. Improved operational efficiency and improved process economics as a result of:
   (a) Continuous feeding of the charge gas mixture and continuous withdrawal of product gas streams (primary and secondary) at constant pressure and constant flow rates.
   (b) Continuous operation of the compressors and vacuum pumps.
   (c) Efficient utilization of the adsorbent beds.
   (d) Efficient utilization of the available feed pressure energy.
   (e) Absence of large product surge tanks.

While in the drawing the feed gas is shown as being introduced to flow downwardly through the A and B vessels, it will be understood that the initial feed, if desired, may be introduced to flow upwardly through these A and B vessels in that order. In that event the directions of other gas flows will be changed to maintain the same relative directions with respect to the flow of the feed gas.

What is claimed is:

1. In the separation of a multicomponent feed gas mixture with the individual recovery of a primary key component and a secondary key component present in such mixture, by selective sorption, wherein said secondary key component is more strongly sorbed than the primary key component and there is present in said mixture at least one minor dilute tertiary gas component less strongly sorbed than the secondary key component;

the method which comprises, in an adiabatic adsorption pressure swing cycle the steps of:

(a) passing such multicomponent gas mixture at initial superatmospheric pressure and in selected flow direction through a first sorbent bed (A) selective for preferential retention of said secondary key component and then passing the effluent from said first bed through a second sorbent bed (B) selective for retention of said tertiary component(s) as opposed to said primary key component, and discharging from said second sorbent bed unadsorbed primary key component, said passing of the multicomponent gas mixture being continued for a controlled time period until or short of breakthrough of said secondary key component from said first sorbent bed, while retaining all of the said tertiary components in said second sorbent bed;

(b) thereafter discontinuing gas flow communication between said first and second sorbent beds, and (i) rinsing said first bed by flowing a stream of relatively pure secondary key component therethrough at substantially the initial feed pressure level for a controlled time period effective to purge most of the void and displaced gases from the said first bed, and during this time period (b), (ii) lowering the pressure in said second bed to an intermediate level by withdrawing a gas stream therefrom including void and desorbed gases, and thereafter;

(iii) further depressuring said second bed to near ambient pressure [followed by;]

[(iv) purging the second bed at near ambient pressure with a stream of primary key component];

(c) after said rinsing step in (b) above reducing the pressure in said first bed to an intermediate level by desorption of gas therefrom including previously sorbed secondary key component and during this step (c),

*(iv) purging the second bed at near ambient pressure with a stream of primary key component and* repressuring the second bed to an [immediate] *intermediate* pressure level by flow thereinto of gas essentially free of the secondary key component;

(d) following step (c) above further desorbing gas from said first bed to lower the pressure therein to substantially ambient level, and thereafter;

(e) evacuating said first bed to subatmospheric level;

(f) after attaining the subatmospheric level in the said first bed, introducing thereinto a gas stream substantially free of the secondary key component to bring said first bed to an intermediate pressure level, and thereafter;

(g) further repressurizing said first bed to initial superatmospheric feed pressure level by flowing thereinto primary key product gas via a second bed already pressurized to the intermediate pressure level (step c), thereby bringing both beds to the feed pressure level and making them ready to repeat the defined sequence of steps beginning with the reintroduction of the multicomponent feed gas mixture into the said first sorbent bed.

2. The method as defined in claim 1, wherein said multicomponent feed gas mixture comprises hydrogen as the primary key component, carbon dioxide as the secondary key component and as tertiary gas component at least one gas from the group consisting of methane, carbon monoxide and nitrogen.

3. The method as defined in claim 2 wherein a carbonaceous solid adsorbent is employed in at least said first bed.

4. A method as defined in claim 2 wherein the separation of the multicomponent feed gas mixture is effected in a system comprising a plurality of such first sorbent beds (A) operating sequentially in parallel during a fixed cycle and a plurality of such second sorbent beds (B), at least one of which second beds (B) is selectively coupled in series with one or another first bed (A) during the passage of the feed gas mixture into such first bed.

5. The method as defined in claim 4 wherein said rinsing of the first bed at substantially feed pressure level during step (b) above is effected in the same flow direction as that employed during initial introduction of the multicomponent feed gas mixture.

6. The method as defined in claim 5 wherein the effluent gas discharged during said rinsing step is sent to another first bed then receiving (step a) multicomponent feed gas for separation.

7. The method as defined in claim 4 wherein the defined pressure lowering of said second bed to an intermediate pressure during step (b) above is effected at least in part by transfer of gas withdrawn therefrom to a previously evacuated first bed of the defined system, thereby substantially equalizing pressure between said beds involved in the transfer.

8. The method as defined in claim 7 wherein such withdrawal of gas from the second bed for transfer to an evacuated first bed is effected in a direction counter to the direction of passing of the residual portion of the feed gas mixture therethrough at initial substantially superatmospheric pressure.

9. The method as defined in claim 4 wherein the defined pressure lowering of said second bed to an intermediate pressure during step (b) above is effected in two sequential procedures, during the first of which procedures withdrawn gas is transferred to a previously evacuated first bed (A) of the defined system, and during the second procedure the remainder of the withdrawn gas is transferred to another second bed (B) of the system to equalize the pressures between said second beds involved in the transfer.

10. The method as defined in claim 9 wherein such gas withdrawal from said second bed is effected in a direction opposite to that of initial passage of the multicomponent feed gas mixture into said second bed.

11. The method as defined in claim 9 wherein said transfer of withdrawn gas into the evacuated first bed is effected by flow of gas into such first bed in a direction opposite to that of initial feed gas flow therein.

12. The method as defined in claim 9 wherein said transfer of such withdrawn gas into the evacuated first bed is effected by flow of gas into such first bed in a direction concurrent to that of initial feed gas flow therein.

13. The method as defined in claim 4 wherein the defined purging of the said second bed at near ambient pressure during step (b) above using part of the primary key component product is carried out in a direction opposite to that of initial passage of the multicomponent feed gas mixture into the said second bed.

14. The method as defined in claim 4 wherein the defined partial repressuring of the second bed during step (c) above is effected by introducing primary product gas into the bed in a flow direction opposite to that of the initial feed gas flow therein.

15. The method as defined in claim 4 wherein the defined partial repressuring of the second bed during step (c) above is effected in two sequential procedures, during the first of which procedures withdrawn gas from another second bed undergoing the pressure reduction step (b) above is introduced into the said second bed in a flow direction concurrent to that of the initial feed gas flow therein and during the second procedure primary product gas is introduced into the said second bed in a flow direction opposite to that of the initial feed gas flow.

16. The method as described in claim 4 wherein the desorbed gas during pressure reduction of said first bed as defined in step (c) above is recompressed to feed pressure level and recirculated as the rinse gas into another first bed of the system then undergoing rinsing as defined in step (b) above.

17. The method as defined in claim 16 wherein the said desorption step is carried out by flowing the gas in a direction opposite to that of the initial feed flow through the bed.

18. The method as defined in claim 4 wherein the pressure reduction of said first bed as defined in step (d) is effected in a direction opposite to that of the initial feed gas flow through the bed.

19. The method as defined in claim 4 wherein said evacuation of the first bed as recited in step (e) above is effected in a flow direction therein opposite to that of the initial feed gas flow therein.

20. The method as defined in claim 4 wherein said evacuation of the first bed defined in step (e) is effected by pulling vacuum at an intermediate level of said first bed.

21. The method as defined in claim 4 wherein the said partial pressurization of the first bed during step (f) above to an intermediate pressure level is effected by flowing the desorbed gas from a second bed then undergoing the pressure reduction step (b).

22. The method as defined in claim 4 wherein final pressurization of a first and a second adsorbent bed to the initial superatmospheric feed pressure during step (g) above is effected by bringing a second bed in flow communication with a first bed, both of which are previously pressurized to the same intermediate pressure, and then flowing primary key product into the said second bed in a flow direction opposite to that of the feed gas flow through those beds.

23. The method as defined in claim 4 wherein during the aforesaid rinsing step of said first bed as recited in step (b) above, at least part of the effluent gas from said bed is added to the multicomponent feed gas mixture.

24. The method as defined in claim 1 wherein during the aforesaid rinsing step of said first bed as recited in step (b) above, at least part of the effluent gas from said bed is added to the multicomponent feed gas mixture.

25. In the separation of a multicomponent feed gas mixture with the individual recovery of a primary key component and a secondary key component present in such mixture, by selective sorption, wherein said secondary key component is more strongly sorbed than the primary key component and there is present in said mixture at least one minor tertiary gas component less strongly sorbed than the secondary key component; the method which comprises effecting such selective sorption in a system comprising a plurality of first sorbent beds (A) operated in parallel in timed sequence and a plurality of second sorbent beds (B) operated in parallel in timed sequence, said first beds containing said sorbent selective for preferential retention of said secondary key component and said second beds containing solid sorbent selective for retention of said tertiary component(s) as opposed to said primary key component; and wherein during a completed cycle each of said first beds (A) undergoes a successive sequence of steps comprising:

(a) passage of the multicomponent feed gas mixture therethrough at superatmospheric pressure in a selected positive flow direction; with discharge therefrom of an effluent gas stream composed of the unadsorbed portion of the feed gas mixture;

(b) discontinuing the passage of feed gas mixture into the bed and discharge of effluent therefrom, followed by rinsing of the bed at substantially initial feed gas pressure level by flow therethrough of relatively pure secondary key component;

(c) after step (b) depressuring the bed to an intermediate pressure level by gas withdrawal therefrom;

(d) further withdrawing contained gas from said bed to bring the bed to substantially ambient pressure level;

(e) lowering the bed pressure to subatmospheric level by evacuation;

(f) then again bringing the bed to an intermediate pressure level by introduction therein of a product gas substantially free of secondary key component;

(g) and finally bringing the bed to superatmospheric feed pressure level by flow thereinto of substantially pure primary key component; and during the time period for such complete cycle undergone by each first (A) bed, each of the second (B) beds undergoes twice in succession the steps of:

(h) receiving the previously unadsorbed effluent portion of the initial feed gas mixture discharging from a first bed undergoing step (a) above, with discharge therefrom of an effluent gas stream composed of the unadsorbed portion of the primary key component of the feed gas mixture;

(i) after discontinuing passage therein of said first bed effluent, lowering the pressure of such second (B) bed by transfer of gas therefrom into an evacuated first bed that has undergone step (e) above;

(j) after step (i), further depressurizing such second bed by transfer of gas therefrom into another second bed which has undergone the purge step (l) below;

(k) after step (j) further depressurizing such second bed to or near ambient pressure;

(l) purging such second bed at or near ambient pressure with primary key component product;

(m) bringing such second bed to an intermediate pressure level by introduction of desorbed gas from another second bed undergoing step (j);

(n) and finally introducing substantially pure primary key component into such second bed to bring the bed to substantially feed gas pressure level.

26. The method as defined in claim 25 wherein said feed gas mixture contains hydrogen as primary key component, carbon dioxide as a secondary key component, and as tertiary component at least one gas from the group consisting of methane, nitrogen and carbon monoxide.

27. The method as defined in claim 26 wherein said adsorption system is comprised of six first (A) beds and three second (B) beds, each of said B beds being connected in flow communication with a first bed (A) during at least the final repressurizing of the latter bed to permit gas flow from the second bed to the communicating first bed.

* * * * *